US012635051B2

(12) United States Patent
Stark et al.

(10) Patent No.: US 12,635,051 B2
(45) Date of Patent: May 19, 2026

(54) PROGRAMMABLE BLANKING FOR ASYNCHRONOUS DRIVER BREAK

(71) Applicant: Tridonic GmbH & Co KG, Dornbirn (AT)

(72) Inventors: Stefan Stark, Muntlix (AT); Clemens Kucera, Bludenz (AT); Manuel Egle, Hohenems (AT)

(73) Assignee: Tridonic GmbH & Co KG, Dornbirn (AT)

( * ) Notice: Subject to any disclaimer, the term of this patent is extended or adjusted under 35 U.S.C. 154(b) by 71 days.

(21) Appl. No.: 18/712,791

(22) PCT Filed: Nov. 25, 2022

(86) PCT No.: PCT/EP2022/083228
§ 371 (c)(1),
(2) Date: May 23, 2024

(87) PCT Pub. No.: WO2023/311035
PCT Pub. Date: Jun. 22, 2023

(65) Prior Publication Data
US 2025/0024572 A1 Jan. 16, 2025

(30) Foreign Application Priority Data
Dec. 16, 2021 (EP) .................................... 21214970

(51) Int. Cl.
*H05B 45/3725* (2020.01)
*H02M 1/00* (2007.01)
(Continued)

(52) U.S. Cl.
CPC ...... *H05B 45/3725* (2020.01); *H02M 1/0038* (2021.05); *H02M 3/158* (2013.01);
(Continued)

(58) Field of Classification Search
None
See application file for complete search history.

(56) References Cited

U.S. PATENT DOCUMENTS

2009/0079355 A1 3/2009 Zhou
2010/0061124 A1* 3/2010 Gong ................ H02M 3/33507
363/21.04
(Continued)

OTHER PUBLICATIONS

EP21214970.2, European Examination Report, dated Apr. 23, 2025, 5 pages.
(Continued)

*Primary Examiner* — Kenneth B Wells
(74) *Attorney, Agent, or Firm* — Andrus Intellectual Property Law, LLP

(57) ABSTRACT
The invention concerns a converter circuit for providing a load current to a load, in particular to a lighting device such as a LED lighting module. The converter circuit comprises at least one switch configured to switch between a conducting state and a non-conducting state based on a switch control signal. A current sense circuit of the converter circuit generates a current sense signal based on a sensed current via the switch. Based on the current sense signal, a control circuit of the converter circuit generates the switch control signal. The control circuit controls the switch to switch asynchronously from the conducting state to the non-conducting state when the current sense signal reaches a threshold value. The converter circuit is characterized by the control circuit setting a blanking time interval, wherein the blanking time interval starts at a time when the switch switches from the non-conducting state to the conducting state, and, during the blanking time interval, the control circuit inhibits switching the switch from the conducting state to the non-conducting state.

10 Claims, 6 Drawing Sheets

(51) Int. Cl.
| | |
|---|---|
| *H02M 3/158* | (2006.01) |
| *H02M 3/335* | (2006.01) |
| *H05B 45/14* | (2020.01) |
| *H05B 45/59* | (2022.01) |

(52) U.S. Cl.
CPC ........ *H02M 3/33507* (2013.01); *H05B 45/14* (2020.01); *H05B 45/59* (2022.01)

(56) References Cited

U.S. PATENT DOCUMENTS

| | | | |
|---|---|---|---|
| 2013/0134894 A1 | 5/2013 | Kuang | |
| 2014/0253061 A1* | 9/2014 | Yang ..................... | H02M 3/158 323/271 |
| 2017/0288554 A1* | 10/2017 | Fahlenkamp ..... | H02M 3/33592 |
| 2018/0262096 A1* | 9/2018 | Hsu .................. | H02M 3/33507 |
| 2019/0165681 A1 | 5/2019 | Liu | |
| 2020/0021284 A1* | 1/2020 | Thalheim .......... | H03K 17/0822 |

OTHER PUBLICATIONS

Zhang, X. et al., "A Self-Adaptive Blanking Circuit for IGBT Short-Circuit Protection Based on VCE Measurement", 2015 IEEE Energy Conversion Congress and Exposition (ECCE), IEEE, Sep. 20, 2015, pp. 4125-4131.
PCT/EP2022/083228, International Search Report and Written Opinion, dated Feb. 6, 2023, 8 pages.

* cited by examiner

PROGRAMMABLE BLANKING FOR ASYNCHRONOUS DRIVER BREAK

CROSS REFERENCE TO RELATED APPLICATIONS

The present application is the U.S. national stage application of international application PCT/EP2022/083228 filed Nov. 25, 2022, which international application was published on Jun. 22, 2023 as International Publication WO 2023/110359 A1. The international application claims priority to European Patent Application No. 21214970.2 filed Dec. 16, 2021.

BACKGROUND AND SUMMARY

The invention concerns the field of converter circuits in a switched-mode power supply topology, for example, DC-DC converter circuits for driving lighting devices. A converter circuit and a method for controlling a switch of the converter circuit implementing an asynchronous driver break are proposed.

Using converter circuits in a switched-mode power supply topology, for example buck converters or flyback converters, for generating a supply voltage or a supply current (load current) for an electric load is generally known. Such converter circuits include a control circuit, which controls a semiconductor switch of the converter circuit to change between a conducting state and a non-conducting state of the switch. In the conducting state of the switch, electric energy is stored in an inductance or transformer of the converter circuit, and in the non-conducting state of the switch, the converter circuit provides the energy stored in the inductance to the load. In many circuit topologies used for switched mode power supplies, the state of the switch affects a current (inductor current) through the inductance or transformer. For example, in a specific topology, switching between a conducting state of the switch and the non-conducting state of the switch results in an increase in inductor current during the conducting state of the switch, followed by a decrease in the inductor current during the non-conducting state of the switch. The control circuit controls the switching cycle between the conducting state and the non-conducting state of the switch based on a sensed current value of the current through the inductance.

A digital microprocessor or an application-specific integrated circuit (ASIC) may implement the control circuit for generating the control signal for the switch. The converter circuit provides a current sense signal corresponding to the actual current via the switch and the inductance to an input of the control circuit. The control circuit compares the current sense signal with a reference signal. In case the digital current sensor signal exceeds the reference signal, the control circuit controls the switch from the conducting stage to the non-conducting state. However, the control circuit performs synchronization of the digital current sense signal, A/D-conversion, and switching processes in digital circuits, and generating a switch drive signal for controlling the switch inevitably leads to a time delay during signal processing. The time delay may result from flip-flop circuit elements and finite state machine (FSM) handling of signals in the digital circuits of the control circuit. This time delay due to signal processing results in a delayed actual switching of the switch of the converter circuit from the conducting state to the non-conducting state. This delayed switching results in a higher peak current through the inductance of the converter circuit, which in turn increases the average inductor current. The control circuit will react by regulating the inductor current to the originally intended target value. An output circuit of the converter circuit usually comprises a capacitor in parallel with an output for smoothing the inductor current. The converter circuit provides the resulting DC current as load current to the load. This sequence of events inevitably results in increased variations in the load current. In case of the converter circuit providing the load current to a LED lighting module, a perceivable flicker in the emitted light may occur.

Introducing an asynchronous break function for the switch drive signal is a potential measure to overcome this problem. The asynchronous break is usually implemented in an ASIC including the switch controller emitting the actual switch drive signal. Instead of using the digital logic of a microprocessor for providing the switch drive signal for switching the switch from the conducting state to the non-conducting state, an asynchronous break is introduced. The asynchronous break function switches the switch immediately from the conducting state to the non-conducting state, in case the analogue current sense signal reaches or exceeds the reference signal. The asynchronous break avoids the time delay introduced by processing the current sense signal from the analogue part of the control circuitry up to the digital part outputting the switch drive signal.

Although the technique of an asynchronous break is known, a further problem arises. In case of switching the switch from the conducting state to the non-conducting state, switching disturbances due to parasitic effects such as signal spikes may occur. Such parasitic effects may result from non-ideal circuit components, in particular the switch itself, and the printed circuit board (PCB) design. These disturbances may include signal spikes on the current sense signal, which even may exceed the reference signal used for implementing the asynchronous break using a comparator. When triggering the asynchronous break, the switching disturbances result in an early switching of the switch from the conducting state to the non-conducting state, thereby reducing the time of the switch in the conducting state during the switch cycle in favour of an increased time of the switch in the non-conducting state. Thus, an average load current output by the converter circuit deviates from a preset target load current, and the converter circuit will have to compensate for this by suitable regulation. In case of the converter circuit providing the load current to an LED lighting module, a perceivable flicker in the emitted light may occur due to these signal disturbances.

A usual measure to overcome these disadvantages of implementing an asynchronous break is arranging an analogue filter circuit before the synchronous break input of the control circuit. The analogue filter improves the issue of an unintended triggering of the asynchronous break, but introduces a further signal delay on the current sense signal, so that designing the filter may prove to be challenging. The additional analogue filter adds a further electrical component to the converter circuits, which inevitably increases cost and requires additional space on the PCB of the converter circuit, which will increase the size of a driver device employing the converter circuit as a core element.

Therefore, it is an object of the invention to improve the current converter circuit design in order to provide a load current with high stability, without increasing complexity of the converter circuit and the manufacturing cost of the electronic circuit. It is in particular an object of the invention to provide a converter circuit with an asynchronous break function and a highly stable load current output for driving a lighting module.

In a first aspect, the converter circuit according to independent claim 1 addresses the aforementioned problem. The luminaire according to a second aspect, the method for controlling the converter circuit according to a third aspect and the program according to fourth aspect provide further advantageous solutions to the problem.

The converter circuit for providing a load current to an electric load, in particular to a lighting device, according to the first aspect comprises at least one switch configured to switch between a conducting state and a non-conducting state based on a switch control signal. The converter circuit further comprises a current sense circuit configured to generate a current sense signal based on a sensed current via the switch, and a control circuit configured to generate the switch control signal based on the current sense signal. The control circuit is configured to control the switch to switch asynchronously from the conducting state to the non-conducting state when the current sense signal reaches a threshold value. The control circuit is further configured to set a blanking time interval wherein the blanking time interval starts at a time when the switch switches from the non-conducting state to the conducting state, and the control circuit is configured to inhibit switching the switch from the conducting state to the non-conducting state during the blanking time interval.

The blanking time interval is a period of a time duration, in particular a programmable time duration. The control circuit sets the time duration of the blanking interval.

The proposed converter circuit is advantageous since it dispenses with the requirement for an analogue hardware filter at the asynchronous break input of the control circuit entirely. Dispensing with the analogue filter results in a reduced number of electronic circuit components, which in turn reduces cost related to the electric components as well as reduces the amount of time for placing the components on the PCB during a manufacturing process. Additionally, the converter circuit decreases the required space on the PCB due to omitting the analogue hardware filter, which affects the size of the converter circuit.

Although the converter circuit dispenses with the analogue filter for the asynchronous break input of the control circuit, the converter circuit still addresses the problem of signal spikes large enough to potentially trigger the asynchronous break function by suppressing (inhibiting) any switching of the switch during the blanking interval. Thus, the converter circuit ensures a stable load current, and a flicker-free output of light is possible in case the load current drives the lighting module as a load.

Introducing a blanking interval enables changing the time duration of the blanking. Accordingly, it may be possible to set the length of the blanking interval based on information on environment influences, for example information on input voltage supplied to the converter circuit or obtained from a mains supply, information on an electric load to which the converter circuit provides the load current, and a target ON-time of the switch or ambient temperature. The ON-time of the switch corresponds to the time the switch is in the conducting state. Environmental influences all may exert undesired effects on the current sense signal and thereby result in untimely, in particular early switching of the switch from the conducting state to the non-conducting state. Thereby the converter circuit achieves a highly stable load current to the load, in particular to the lighting module, since the converter circuit avoids an unexpected shortening of the ON-time of the switch. The inventive approach provides a robust control of the asynchronous break function results in a stable and light output of the lighting module without perceivable flicker.

The dependent claims define further advantageous embodiments of the invention.

The converter circuit according to a preferred embodiment is a switched mode power supply in a Buck converter topology or a Flyback topology, in particular a synchronous Buck topology or synchronous Flyback topology.

Synchronous Buck and synchronous Flyback circuits include two switches replacing the one switch and one diode of the conventional Buck topology, for example. Both topologies characteristically require careful timing considerations for the respective switch drive signals. Thus, these topologies benefit in particular from suppressing the effects of signal spikes due to switching processes combined with the asynchronous break function addressing the disadvantages of the digital switch drive signal generation.

The converter circuit may comprises a comparator configured to compare the current sense signal with the threshold value.

The control circuit of the converter circuit according to an embodiment may include an analogue input terminal. The control circuit is configured to generate the switch control signal to control the switch to switch from the conducting state to the non-conducting state when the current sense signal received at the analogue input terminal reaches or exceeds the threshold value.

According to an embodiment, the control circuit is configured to generate the switch control signal to control the switch to switch immediately from the conducting state to the non-conducting state when the current sense signal received at the analogue input terminal reaches or exceeds the threshold value and the blanking time interval has elapsed.

Thus, the converter circuit overcomes the problem of signal spikes and disturbances reliably, while simultaneously the asynchronous break function avoids the switch being in the conducting state longer than a target ON-time for controlling the switch intends. Time delays due to digital processing, A/D-conversion, or analogue filters do not adversely affect the load current.

According to an embodiment, the control circuit is configured to set the blanking time interval to correspond to a time interval during which current spikes of the current via the switch due to switching the switch from the non-conducting state to the conducting state occur.

The converter circuit may set the blanking time interval based on the electric load to which the load current is provided.

Alternatively or additionally, the control circuit can be configured to obtain a temperature value and to set a time duration of the blanking time interval based on the obtained temperature value.

According to an embodiment, the converter circuit comprises an interface for obtaining an input signal, in particular a user adjustable input signal. The control circuit is configured to set a time duration of the blanking time interval based on the obtained input signal.

In the second aspect, a luminaire comprising the converter circuit according to the first aspect and the at least one lighting module solves the problem.

A method for controlling a converter circuit according to the third aspect concerns the converter circuit configured for providing a load current to a load, in particular to a lighting device. The converter circuit comprises at least one switch configured to switch between a conducting state and a non-conducting state based on a switch control signal, a current sense circuit configured to generate a current sense signal based on a sensed current via the switch, and a control circuit. The control circuit is configured to generate the switch control signal based on the current sense signal.

The method comprises a step of controlling the switch to switch asynchronously from the conducting state to the non-conducting state when the current sense signal reaches a threshold value. The method further comprises a step of setting a blanking time interval. The blanking time interval starts at a time when the switch switches from the non-conducting state to the conducting state, and during the blanking time interval, the control circuit inhibits switching the switch from the conducting state to the non-conducting state.

The fourth aspect concerns a computer program comprising instructions, which when the computer program is executed by a computer or signal processor, cause the computer or signal processor to carry out the method for controlling a converter circuit according to the second aspect.

BRIEF DESCRIPTION OF THE DRAWINGS

The luminaire according to the second aspect, the method according to the third aspect and the computer program according to the first aspect of the invention achieve corresponding advantages as the converter device according to the first aspect. The description of the embodiments refers to the enclosed figures, in which.

DETAILED DESCRIPTION OF THE DRAWINGS

In the figures, same or corresponding elements have same reference signs. The description of the figures omits a discussion of the same reference signs in different figures where considered possible without adversely affecting understandability.

Figure 1:
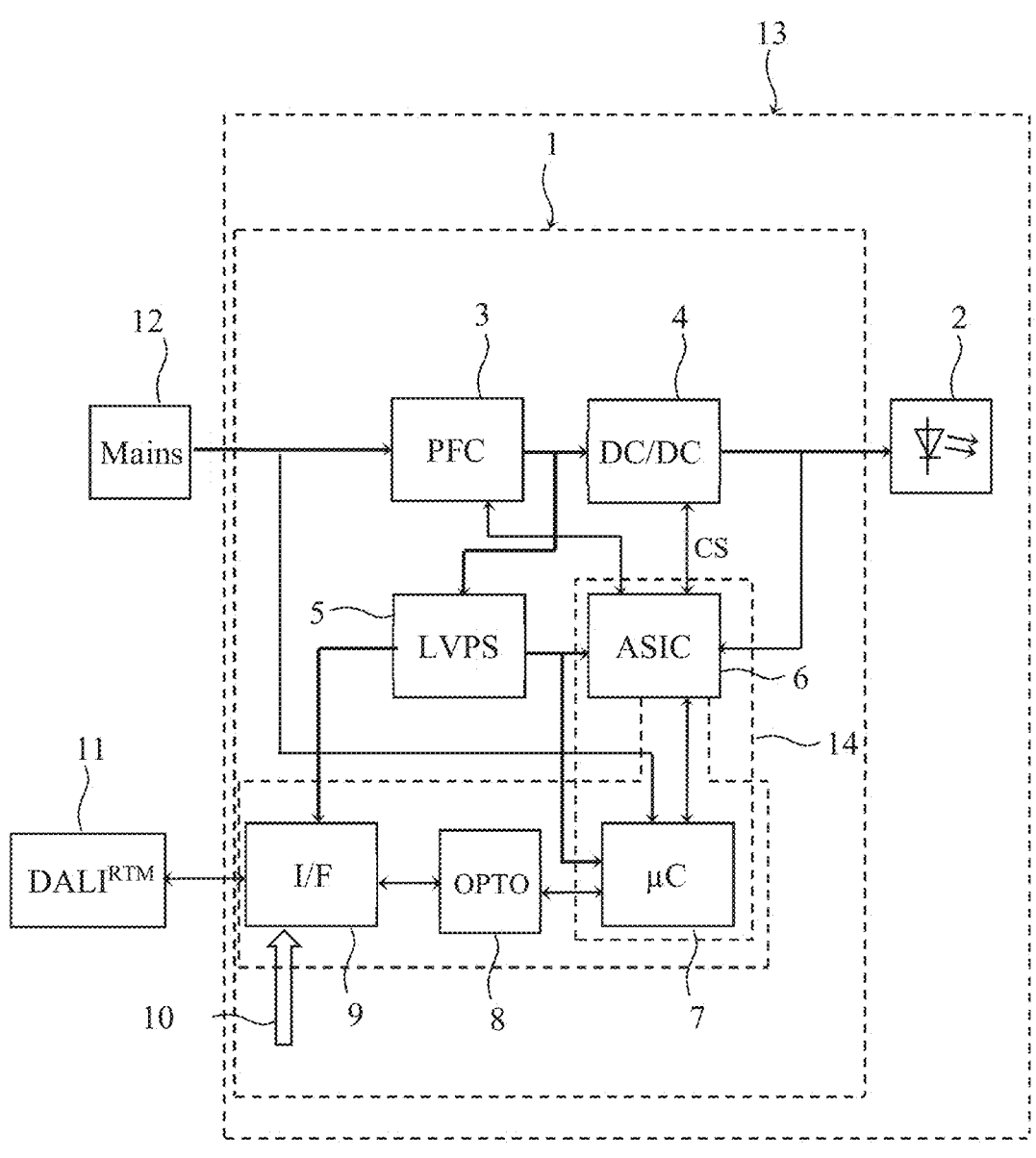
FIG. 1 is a schematic block diagram of a driver device with a lighting module according to an embodiment.

FIG. 1 provides a schematic block diagram of a driver device 1 supplying a lighting module 2 with a load current $I_{LOAD}$.

The driver device 1 and the lighting module 2 may form part of a luminaire 13 according to the second aspect.

In particular, FIG. 1 shows an example of functional elements of the driver device 1, which includes at least one converter circuit 20 according to the first aspect of the invention as described above.

The driver device 1 operates the lighting module 2. In particular, the driver device 1 generates a load current $I_{LOAD}$ as a DC current and provides the load current $I_{LOAD}$ to the lighting module 2.

The lighting module 2 may include one or more LEDs (at least one LED). Additionally or alternatively, the lighting module 2 may comprise lighting means of another type than an LED, for example a gas discharge lamp.

The load current $I_{LOAD}$ provided to the lighting module 2 drives at least one light emitting element of the lighting module 2 to emit light. The light emitting element may include at least one or even a plurality of LEDs. The driver device may comprise a PFC circuit 3 (power factor correction circuit 3). The PFC circuit 3 may comprise an actively switched DC-DC converter as indicated in FIG. 1 for performing the power factor correction or power factor compensation function. Alternatively or additionally, the PFC circuit 3 may comprise filter means, e.g. an EMI filter for filtering electromagnetic interference, and/or rectifier means. The PFC circuit 3 may be implemented in any way known in the art.

The PFC circuit 3 performs power factor correction of the mains supply 12, in particular by increasing the power factor of the AC mains power supply towards the value 1 (unity) or as close as possible towards the value 1 (unity) or to a required threshold level close to the value 1. The PFC circuit 3 may perform active power factor correction using a converter circuit 20 according to the embodiment.

Optionally, the driver device 1 may comprise additional converter stages before the DC-DC converter circuit 4. The optional PFC circuit 3, the optional one or more additional converter stages, and the DC-DC converter circuit 4 form an electrical energy supply circuit for providing electrical energy from an external electrical energy source to the lighting module 2.

The electrical energy source may be AC mains supply 12, as shown in FIG. 1, or another electrical energy source, e.g. an energy source providing a DC voltage.

Thus, the PFC circuit 3, or a converter stage of the optional one or more additional converter stages may supply the DC-DC converter circuit 4 with electrical energy, in particular provide a DC voltage to the DC-DC converter circuit 4.

Optionally, the external electrical energy source 5 may supply, in case the optional PFC circuit 3 is not present, electrical energy to the one or more additional converter stages.

Optionally, the external electrical energy source 5 may supply electrical energy to the PFC circuit 3, as depicted in FIG. 1.

The optional PFC circuit 3 may be controlled by the control system 14, in particular a control IC 6 (control integrated circuit 6), as indicated in FIG. 1.

The optional one or more converter stages may be controlled by the control system 14, in particular the control IC 6.

Figure 2:
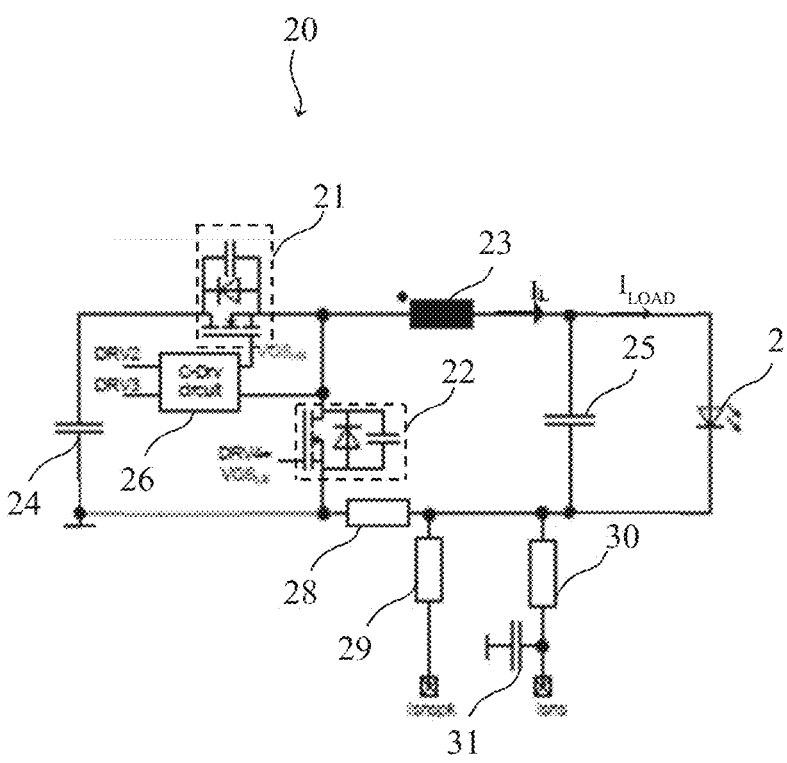
FIG. 2 provides a schematic circuit diagram of a converter circuit according to an embodiment.

The driver device 1 comprises a DC-DC converter circuit 4. FIG. 2 displays a specific example of the DC-DC converter circuit 4. The DC-DC converter circuit 4 obtains a DC current from the PFC circuit 3 and generates a DC current based thereon, which the converter circuit 1 supplies as load current $I_{LOAD}$ to the lighting module 2. The DC-DC converter circuit 4 represents a current source configured to provide the load current $I_{LOAD}$ to the lighting module 2.

At least one of the PFC circuit 3 and the DC-DC converter circuit 4 are a converter circuit 20 according to the embodiment. The converter circuit 20 may have a circuit topology of a synchronous Buck converter or a synchronous Flyback converter.

The driver device 1 comprises an LVPS circuit 5 (Low Voltage Power Supply circuit 5). The low LVPS circuit 5 may obtain a DC current from the PFC circuit 3 and generate one or more supply voltages of a characteristic value for supplying the structural units of the driver device 1 based on the obtained DC current. In particular, the LVPS circuit 5 may electrically supply the elements of the control system 14, in particular the microcontroller 7 and the control IC 6, and a communication interface 9 (interface 9). The external electrical energy source 12 may supply the LVPS circuit 5 electrically. As exemplarily shown in FIG. 1, the PFC circuit 3 supplies electrically the LVPS circuit 5 e.g. with a DC voltage.

The driver device 1 comprises the DC-DC converter circuit 4 configured to provide the current $I_L$ to the lighting module 2, and the control system 14. The control system 14 is configured to control the DC-DC converter circuit 4 and, thus, to control the current $I_L$ provided by the DC-DC converter circuit 4.

The control system 14 may comprise the microcontroller 7 and the control IC 6 as shown in FIG. 1. The control system 14 may include at least one of an ASIC, a microcontroller, a microprocessor, and may further include memory for storing data during execution of a program, memory for storing the program data itself, and data required for any functions of the driver device 1, including log data.

The control IC 6 may be an ASIC or an FPGA. The microcontroller 7 and the control IC 6 may be configured to perform the functions of the control system 14. In particular, the microcontroller 7 and the control IC 6 may be configured to perform the functions of the control system 14 as discussed with regard to FIGS. 2, 3A, 3B, 3C and 7.

The control system 14, in particular the control IC 6, may be configured to control the DC-DC converter circuit 4 by providing a control signal CS to the DC-DC converter circuit 4. The DC-DC converter circuit 4 is an actively switched DC-DC converter with at least one switch, and the control system 14 is configured to control switching of the at least one switch. The control system 14, in particular the control IC 6, may be configured to control switching of the at least one switch by providing the control signal CS to the switch.

Examples of an actively switched DC/DC converter comprise a buck-converter, boost-converter, buck-boost-converter, flyback converter, and resonance converter. The term "actively clocked DC/DC converter" may be used as a synonym for the term "actively switched DC/DC converter". The at least one switch may be or may comprise one or more transistors. Examples of transistors used for the at least one switch comprise field-effect transistors (FETs), e.g. metal-oxide semiconductor FETs (MOSFETs), bipolar junction transistors (BJTs), and insulated gate bipolar transistors (IGBTs).

FIG. 1 does not show a measurement means for measuring the current $I_{LM}$ provided by the DC-DC converter circuit

4 explicitly. The measurement means may comprise a shunt resistor. The measurement means may provide to the control system 14, in particular to the control IC 6, a measurement value of the inductor current $I_L$. The control system 14 may use the measurement values of the inductor current $I_L$ for feedback control of the current $I_L$.

The control IC 6 and the microcontroller 7 of the driver device 1 implement the control system 14 of the driver device 1. The control system 14 of the driver device 1 represents the control circuit of the driver device 1, and, in particular, the control circuit of the converter circuit 20 according to the first aspect. The control circuit of the converter circuit 20 will discussed in detail with reference to FIG. 2.

Alternatively, differing from the embodiment shown in FIG. 1, a single integrated circuit may implement the control circuit resp. the control system 14.

The driver device 1 of FIG. 1 further comprises the communication interface 9 (interface 9). The communication interface 9 is configured to communicate with the outside of the driver device 1. The communication interface 9 may be a DALI® interface providing the driver device 1 with a capability to communicate with a DALI® lighting bus 11 of a lighting system.

In particular, the communication interface 9 receives external signals and provides the received external signals via a galvanic isolation circuit 8 to the microcontroller 7. The microcontroller 7 may generate output signals and provide the generated output signals via the galvanic isolation circuit 8 to the communication interface 9. The communication interface 9 may output the output signals received via the galvanic isolation circuit 8 from the microcontroller 7 to other devices of a lighting system.

The communication interface 9 may be configured to communicate wirelessly and/or wire bound. The communication interface 9 may include a bus interface configured for electrically connecting the driver device 1 to a communication bus 11. The communication bus 11 may be a wired bus. The communication bus 11 may be a DALI®-bus or DALI-2® bus, i.e. a bus according to the DALI® standard (Digital Addressable Lighting Interface standard) or the DALI-2® standard. The communication bus 11 may be any other bus type, such as a DSI bus (Distributed Systems Interface DSI) bus. The communication bus 11 may be part of the luminaire 13.

The communication interface 9 may be configured to be electrically connected to a memory or data storage, e.g. an SD card (Secure Digital memory card) or, a USB flash drive (Universal Serial Bus drive, e.g. an USB stick). Thus, the communication interface 9 may be a SD interface, a USB interface or a similar type of interface.

As shown in FIG. 1, the control system 14, in particular the microcontroller 7, may optionally be electrically connected to the communication interface 9 via the galvanic isolation circuit 8. The galvanic isolation circuit 8 may be implemented using a bidirectional optocoupler, which is configured to ensure electrical separation between the communication interface 9 and the microcontroller 7 by implementing a SELV barrier.

Alternatively, the galvanic isolation circuit 8 may comprise one or more optocouplers, or one or more transformers. Additionally or alternatively, the galvanic isolation circuit 8 may comprise one or more capacitors, or one or more SELV compliant resistors for implementing and bridging the SELV barrier.

The control system 14, in particular the microcontroller 7, may be configured to communicate via the communication interface 11 with outside the operating device 1, i.e. with an external unit outside the driver device 1. Outside the driver device 13 may optionally mean outside the luminaire 13.

The communication interface 9 may receive an input signal 10 from an exterior of the driver device 1 and provide the received input signal 10 to the microcontroller 7 via the galvanic isolation circuit 8.

The input signal 10 may be a user adjustable signal. A user may use a user interface not shown in FIG. 1 in order to provide configuration parameters to the driver device 1 via the input signal 10. The user may provide information on situation dependent settings via the communication interface 9 to the microcontroller 7.

In particular, the user may set a time duration of the blanking interval $t_{blk}$ via a human-machine interface, and provide the set time duration of the blanking interval $t_{blk}$ via the communication interface 9 and the galvanic isolation circuit 8 to the microcontroller 7.

The user may access the microprocessor 7 via the human-machine interface, for selecting one of plural preset values for the time duration of the blanking interval $t_{blk}$ and providing selection information on the selected time duration of the blanking interval $t_{blk}$ via the communication interface 9 and galvanic isolation circuit 8 to the microcontroller 7.

Alternatively or additionally, the input signal 10 may include temperature values of an ambient temperature of the immediate environment of the driver device 1.

The microcontroller 7 may obtain further input signals via the communication interface 9. For example, the microcontroller 7 may obtain further input signals, which include information on a size of the electric load, which the driver device 1 is supplying with the load current $I_{LOAD}$.

For describing the function of the control system 14, and, in particular, control of at least one of the PFC circuit 3 and the DC-DC converter 4, reference is made to the description of the control system 14 according to the first aspect and the description with regard to FIGS. 2, 3A, 3B and 7.

Figure 3A:
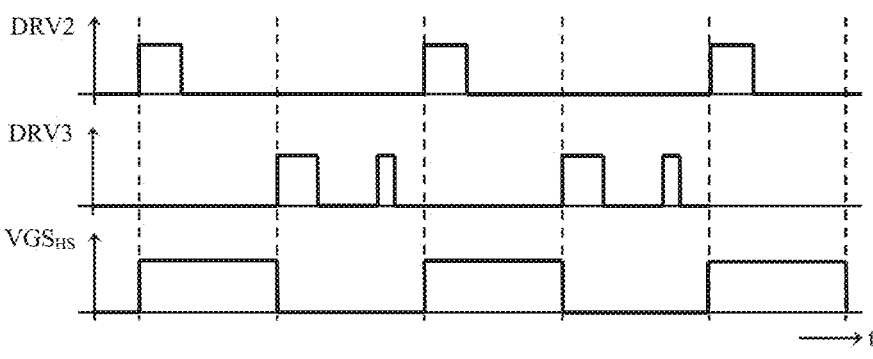
FIG. 3A depicts characteristic signals of the converter circuit illustrating switching over plural switching periods according to an embodiment.
Figure 3B:
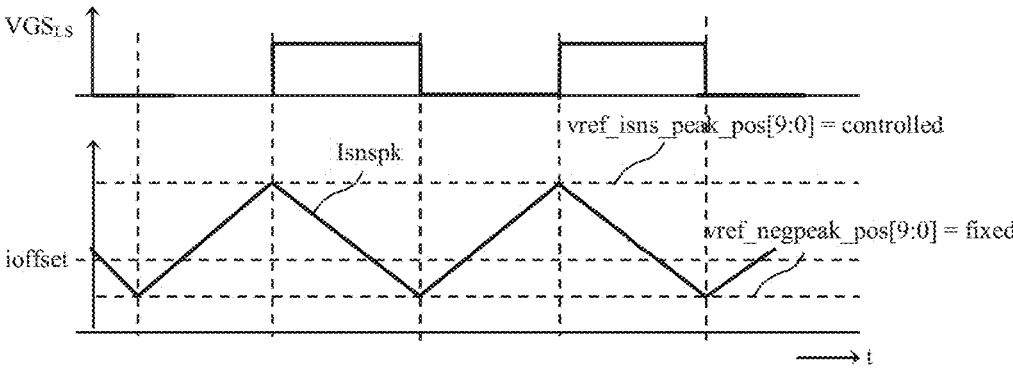
FIG. 3B depicts further characteristic signals of the converter circuit illustrating switching over plural switching periods according to an embodiment.
Figure 3C:
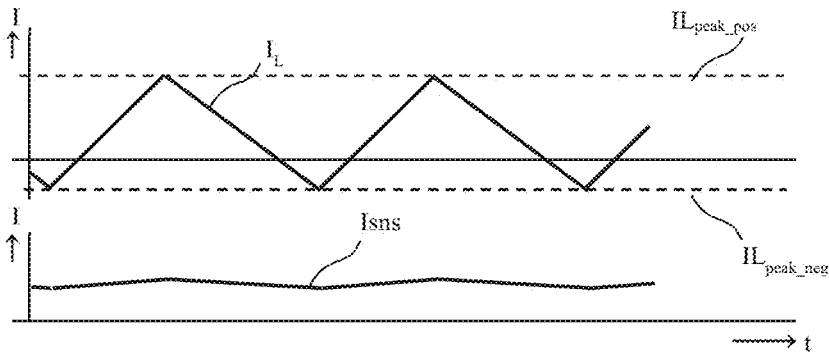
FIG. 3C depicts further characteristic signals of the converter circuit illustrating switching over plural switching periods according to an embodiment.

FIG. 2 provides a schematic circuit diagram of the converter circuit 20 according to an embodiment. In particular, FIG. 2 shows an example of the converter circuit 20 according to the first aspect. FIGS. 3A, 3B, and 3C depict characteristic signals of the converter circuit 20 according to FIG. 2 and may be interpreted together with the simplified circuit diagram of FIG. 2.

The basic operation principle of the Buck converter, and the synchronous Buck converter is generally known in the art of switched-mode power supply, so that a short introduction of terms will suffice.

The Buck converter is a DC-to-DC power converter which steps down a voltage while drawing less average current from an input voltage at a supply input to an output voltage provided to load. The converter circuit 20 is a synchronous Buck converter comprising at least two semiconductor switches 21, 22 and an inductor 23 as at least one energy storage element storing magnetic energy. The converter circuit 20 includes capacitors in the form of a capacitor 24 at the input and a capacitor 25 in parallel with the load in order to reduce voltage ripple. A supply-side filter comprises the capacitor 24 and a load-side filter comprises the capacitor 25 in the converter circuit 20. The supply-side filter and the load-side filter may include further circuit elements, e.g. further inductors in combination with the capacitors 24, 25 respectively.

The load-side filter of FIG. 2 includes the capacitor 25 as a smoothing capacitor arranged electrically in parallel with the output of the converter circuit 20. The capacitor 25 is therefore also in parallel with the lighting module 2.

The inductor current $I_L$ through the inductance 23 includes current components with high frequencies. The inductor current $I_L$ is the current to be sensed for controlling the converter circuit 20.

The capacitor 25 filters the high frequency components in the inductor current $I_L$ so that the load current $I_{LOAD}$ is essentially a DC current suitable for driving the lighting module 2, which, for example, includes LEDs. The load current $I_{LOAD}$ is a constant current, which will only slowly vary in amplitude around an operating point, for example during a dimming process. The inductor current $I_L$, includes, as mentioned before, high frequency components. The capacitor 25 may be interpreted as electronic circuitry, which decouples the inductor current $I_L$ from the load current $I_{LOAD}$.

The switches 21, 22 are semiconductor switches, typically including transistors, for example MOSFETS (Metal Oxide Semiconductor Field Effect Transistors).

The first switch 21 is switched between a conducting state and non-conducting state by a switch control signal $VGS_{HS}$ applied to its gate electrode. The control circuit generates the switch control signal $VGS_{HS}$ and provides the switch control signal $VGS_{HS}$ to the first switch 21.

The terms "switch driver signal" or "switch control signal" are used in present context to described a voltage signal provided to the gate electrode of a semiconductor transistor in order to switch the semiconductor transistor from the conducting state to the non-conducting state and vice versa.

FIG. 2 depicts a switch driver circuit 26, which forms part of the control circuit of the converter circuit 20. The switch driver circuit 26 may form part of the ASIC 6 shown in FIG. 1. The switch driver circuit 26 generates the switch control signal $VGS_{HS}$ based on driver signals DRV2 and DRV3.

FIG. 3A illustrates the driver signals DRV2 and DRV3 and the resulting switch control signal $VGS_{HS}$ over time.

The second switch 22 is switched between a conducting state and non-conducting state by a switch control signal $VGS_{LS}$ corresponding to a driver signal DRV4 generated by the control circuit and applied to the gate electrode of the second switch 22.

The control circuit generates the driver signals DRV2, DRV3, and DRV4 for switching the switches 21, 22 from the conducting state to the non-conducting state and vice versa based on sensed values for the inductor current $I_L$. The converter circuit 20 arranges a shunt resistor 28 for determining the inductor current $I_L$ In particular, a peak value of the inductor current $I_L$ may be detected based on the peak current detection signal Isnspeak provided by the converter circuit 20 via a resistor 29. An average inductor current $I_L$ may be determined based on the average current detection signal Isns provided by the converter circuit 20 via resistor 30 and capacitor 31.

FIG. 3B illustrates the switch control signal $VGS_{HS}$ and the resulting inductor current $I_L$ over time.

FIG. 3C illustrates the resulting inductor current $I_L$ and the respective current sense signals, the peak current detection signal Isnspeak and the average current detection signal Isns over time.

The control circuit controls the current through the inductor 23 by controlling the switches 21, 22. The first switch 21 and the second switch 22 operate in a complementary manner, meaning that when the first switch 21 is in a conducting state, the second switch 22 is in a non-conducting state. In case the first switch 21 is in a non-conducting state, the second switch 22 is in a conducting state.

The term "conducting state" refers to the respective switch 21, 22 being closed, so that a current may flow through the switch 21, 22. The term "non-conducting state" refers to the respective switch 21, 22 being open, so that no current can flow through the switch 21, 22.

It is worth noting that the description of the converter circuit 20 based on FIGS. 2, 3A, 3B, and 3C by reference to the synchronous Buck converter in a continuous conduction mode is only an example and not intended to limit the invention defined in the claims. For example, a synchronous Flyback converter circuit may also apply the approach of using a blanking interval $t_{blk}$ for achieving corresponding advantageous effects, which will be discussed with reference to FIGS. 4 to 7 in more detail.

In FIGS. 3A, 3B, and 3C, the abscissa axis depicts the time t. The ordinate axis indicates voltage values or current values of the voltage curve or current curve of the respective figure.

FIGS. 3A, 3B, and 3C depict the voltage curves or current curves of the converter circuit operating as synchronous Buck converter (sBuck) in a continuous conduction mode.

FIG. 3A depicts characteristic signals of the converter circuit 20 illustrating switching over plural switching periods according to the embodiment of FIG. 2. In particular, FIG. 3A illustrates the driver signals DRV2 and DRV3 and the resulting switch control signal $VGS_{HS}$ over time.

FIG. 3B depicts characteristic signals of the converter circuit 20 illustrating switching over plural switching periods according to the embodiment of FIG. 2. FIG. 3B illustrates the switch control signal $VGS_{HS}$ and the resulting inductor current $I_L$ over time.

FIG. 3C depicts characteristic signals of the converter circuit 20 illustrating switching over plural switching periods according to the embodiment of FIG. 2.

FIG. 3C illustrates the resulting inductor current $I_L$ and the respective current sense signals, the peak current detection signal Isnspeak and the average current detection signal Isns over time.

Figure 4:
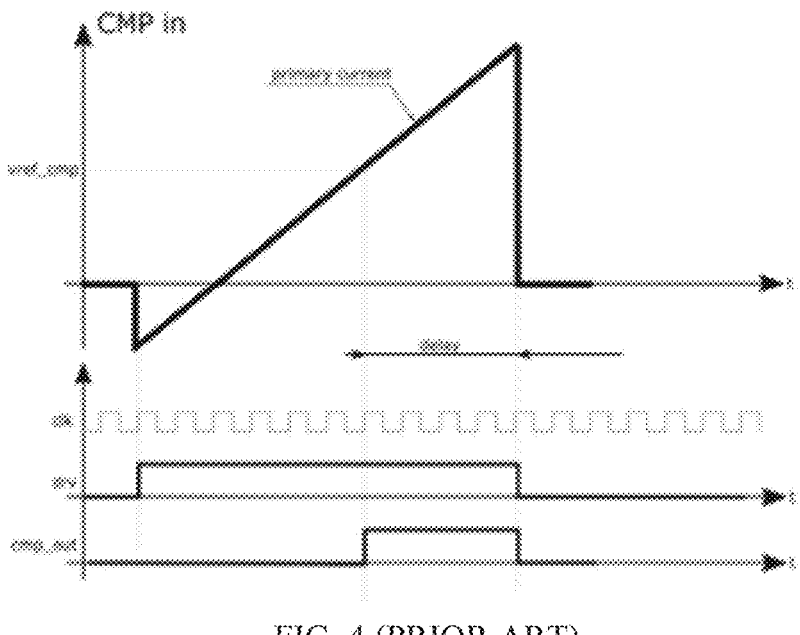
FIG. 4 shows a switching period with characteristic signals of a converter circuit illustrating switching without asynchronous break according to prior art.
Figure 5:
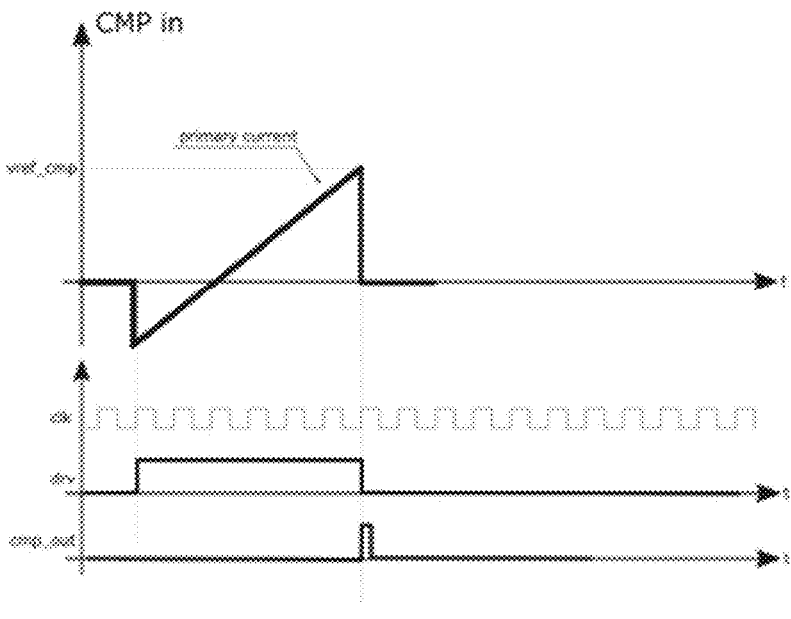
FIG. 5 shows a switching period with characteristic signals of the converter circuit illustrating switching with an asynchronous break according to prior art.
Figure 6:
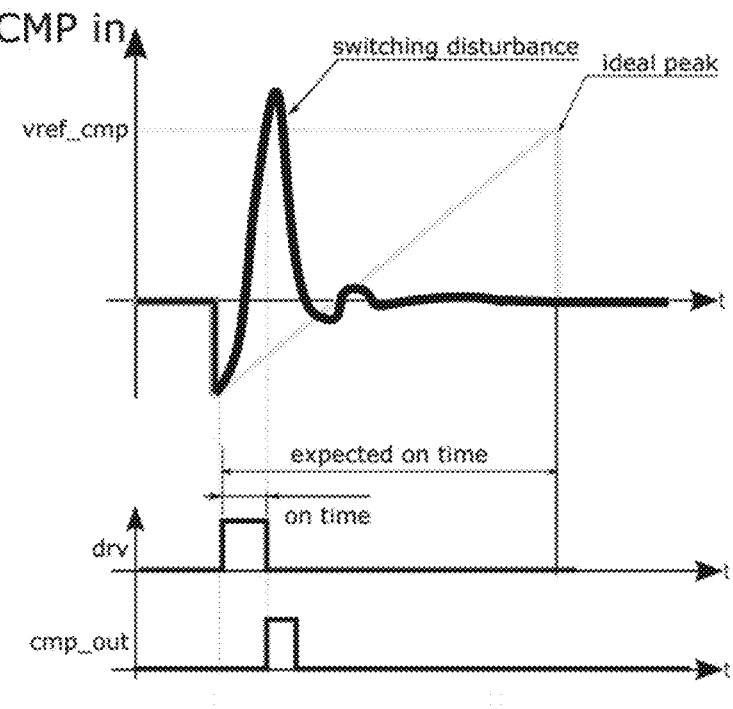
FIG. 6 shows a switching period with characteristic signals of the converter circuit illustrating switching with an asynchronous break and illustrating the effects of switching disturbances according to prior art.

FIGS. 4 to 6 illustrate the advantageous effect of the converter circuit 20 and the method of controlling the switches 21, 22 of the converter circuit 20 and thereby represent useful background art for understanding the invention. FIG. 4 depicts the current through the primary winding of a transformer of a synchronous flyback converter circuit (sFLB converter circuit).

FIG. 4 shows a switching period with characteristic signals of the known sFLB converter circuit illustrating the switching sequence without an asynchronous break according to the prior art.

In FIG. 4, the abscissa axis depicts the time t. The ordinate axis of FIG. 4 indicates voltage values or current values of the voltage curve or current curve.

The upper portion of FIG. 4 shows a current sense signal corresponding to the primary current flowing through the primary winding of the transformer of the sFLB converter circuit while first switch is closed (conducting state) and a second switch is open (non-conducting state). In particular, the current sense signal corresponds to the inductor current $I_L$ provided to the load by the sFLB converter circuit. The current sense signal is provided to a comparator input CMP_in of a comparator circuit of the sFLB control circuit. The comparator circuit compares the current sense signal with a reference voltage vref_cmp. The comparator circuit outputs a positive comparator output signal cmp_out, when the voltage value of current sense signal CMP_in exceeds the reference voltage vref_cmp.

The switch drive signal drv of FIG. 4 corresponds to the switch control signal $VGS_{HS}$ of the control circuit of FIG. 2.

In FIG. 4, a delay of four clock cycles of a digital clock signal clk is assumed to elapse starting from the time when the current sense signal reaches the reference voltage vref_cmp, and until the actual switching of the switches 21, 22 by a switch drive signal drv, in particular until the first switch 21 is switched into a non-conducting state.

FIG. 4 illustrates that any delay between the time when the voltage value of current sense signal CMP_in reaches the reference voltage vref_cmp and the time, when the output signal cmp_out of the comparator results in the first switch 21 being switched to a non-conducting state by the switch drive signal drv, will result in an extended time the first switch 21 is in a conducting state. Thus, the primary current of FIG. 4, corresponding to the inductor current $I_L$, will increase further during the delay. The peak current value of the inductor current $I_L$ and the average current value of the inductor current $I_L$ will accordingly also increase beyond a target current value set by the control circuit.

The control circuit will counteract this increase by regulating the load current $I_{LOAD}$ and the inductor current $I_L$ towards smaller current values. In the case of the load current $I_{LOAD}$ driving the lighting module 2, a perceivable flicker of the output light may occur.

A known measure to suppress this flicker is to introduce the asynchronous break into the known control circuit. FIG. 5 shows a switching period with the characteristic signals of the known converter circuit illustrating a switching sequence with an asynchronous break according to the prior art.

There exist microcontroller circuits, which include timer circuits and have a break input. FIG. 5 assumes the control circuit using this break input for controlling the switches 21, 22 to switch immediately in case the current sense signal reaches the reference voltage vref_cmp.

The switch drive signal dry of FIG. 5 corresponds to the switch control signal $VGS_{HS}$ of the control circuit of FIG. 2.

The signal curve of the switch drive signal dry in FIG. 5 shows that the actual switching of the switches 21, 22 by a switch drive signal dry is executed immediately and asynchronously when the current sense signal reaches the reference voltage vref_cmp.

Switching the first switch 21 into the non-conducting state provides the effect that the primary current and the inductor current $I_L$ will not increase contrary to the situation in FIG. 4. The peak current value of the inductor current $I_L$ and the average current value of the inductor current $I_L$ will accordingly correspond to the values assumed as basis for regulating the inductor current $I_L$.

In the case of the load current $I_{LOAD}$ driving the lighting module 2, the flicker of the output light visible in the situation shown in FIG. 4 should be suppressed sufficiently.

FIG. 6 shows a switching period with characteristic signals of the known converter circuit illustrating switching with an asynchronous break. Nevertheless, the example depicted in FIG. 6 explicitly regards the effects of switching disturbances of electronic switches 21, 22 due to parasitic effects of the switches 21, 22, the switch driver signals and the PCB mounting the converter circuit, for example.

The switch drive signal dry of FIG. 6 corresponds to the switch control signal $VGS_{HS}$ provided by the control circuit of FIG. 2.

FIG. 6 assumes a voltage peak at the comparator input CMPin. The peak value of the voltage peak at the comparator input CMPin exceeds the value of the reference voltage vref_cmp. The signal curve of the switch drive signal dry in FIG. 6 shows that the actual switching of the switches 21, 22 by the switch drive signal dry is triggered immediately and asynchronously when the voltage peak at the comparator input CMPin reaches the reference voltage vref_cmp.

The effect of the early switching of the switches 21, 22 by the switch drive signal dry is a significantly reduced period during which the first switch 21 is in a conducting state and the second switch 22 is in a non-conducting state. This shortened period in which the first switch 21 is in a conducting state and the second switch 22 is in a non-conducting state deviates significantly from a targeted period during which the first switch 21 is in a conducting state and the second switch 22 is in a non-conducting state.

An average inductor current $I_L$ for driving the lighting module 2 will accordingly again result in flicker of the output light, and the control circuit will have to regulate the converter circuit suitably in order to regulate the inductor current $I_L$ to its target value.

A known measure to counter this flicker is arranging a low pass filter (analogue filter) at the input CMPin of the control circuit in order to suppress the effects of the interfering disturbances on the signal.

Figure 7:
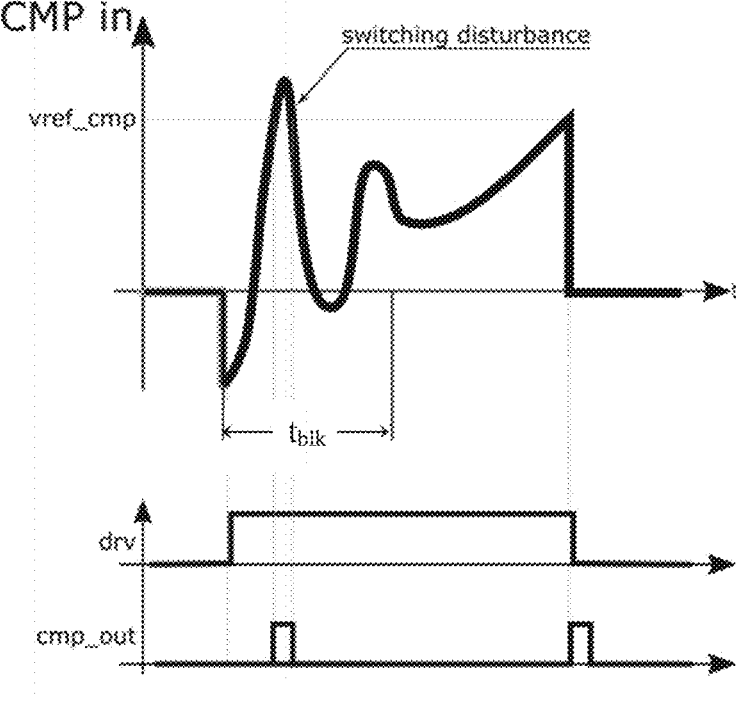
FIG. 7 shows a switching period with characteristic signals of the converter circuit illustrating switching with an asynchronous break and illustrating the effects of switching disturbances according to an embodiment.

FIG. 7 shows a switching period with characteristic signals of the converter circuit 20 according to an embodiment illustrating the switching sequence with an asynchronous break and further introducing the blanking interval. FIG. 7 illustrates the advantageous effects of coping with switching disturbances achieved by the embodiment and discussed in detail with respect to FIGS. 4 to 6.

The switch drive signal dry of FIG. 7 corresponds to the switch control signal $\text{VGS}_{HS}$ of the control circuit of FIG. 2.

The control circuit sets a blanking time interval $t_{blk}$ (blanking period). The blanking time interval $t_{blk}$ starts at a time when the first switch 21 switches from the non-conducting state to the conducting state. The blanking time interval $t_{blk}$ has a time duration.

Preferably, the length of the blanking time interval $t_{blk}$ is set to a time duration which ensures that spurious effects of switching the switches 21, 22 have subsided, when the blanking time interval $t_{blk}$ ends.

During the blanking time interval $t_{blk}$, the control circuit 20 inhibits switching the switches 21, 22 from the conducting state to the non-conducting state.

The blanking time interval $t_{blk}$ replaces the analogue filter for suppressing interfering signals at the input CMP of the prior art and results therefore in a reduced number of electronic circuit components of the converter circuit 20.

The blanking time interval $t_{blk}$ enables changing the time duration of the blanking effect. The control circuit may determine the time duration of the blanking time interval $t_{blk}$, based on an environment influence, or a user input.

The control circuit 20 may determine the time duration of the blanking time interval $t_{blk}$ based on information on an input voltage to the converter circuit 20. The input voltage may be a rectified mains voltage, or a DC bus voltage of the driver device 1.

Additionally or alternatively, the control circuit 20 may determine the time duration of the blanking time interval $t_{blk}$ based on information on an electrical load the converter circuit 20 supplies with the inductor current $I_L$.

Additionally or alternatively, the control circuit 20 may determine the time duration of the blanking time interval $t_{blk}$ based on information on an expected ON-time of the first switch 21. The ON-time of the switches 21, 22 is the time during which the switches 21, 22 are in a conducting state.

Additionally or alternatively, the control circuit 20 may determine the time duration of the blanking time interval $t_{blk}$ based on information on a current ambient temperature.

Figure 8:
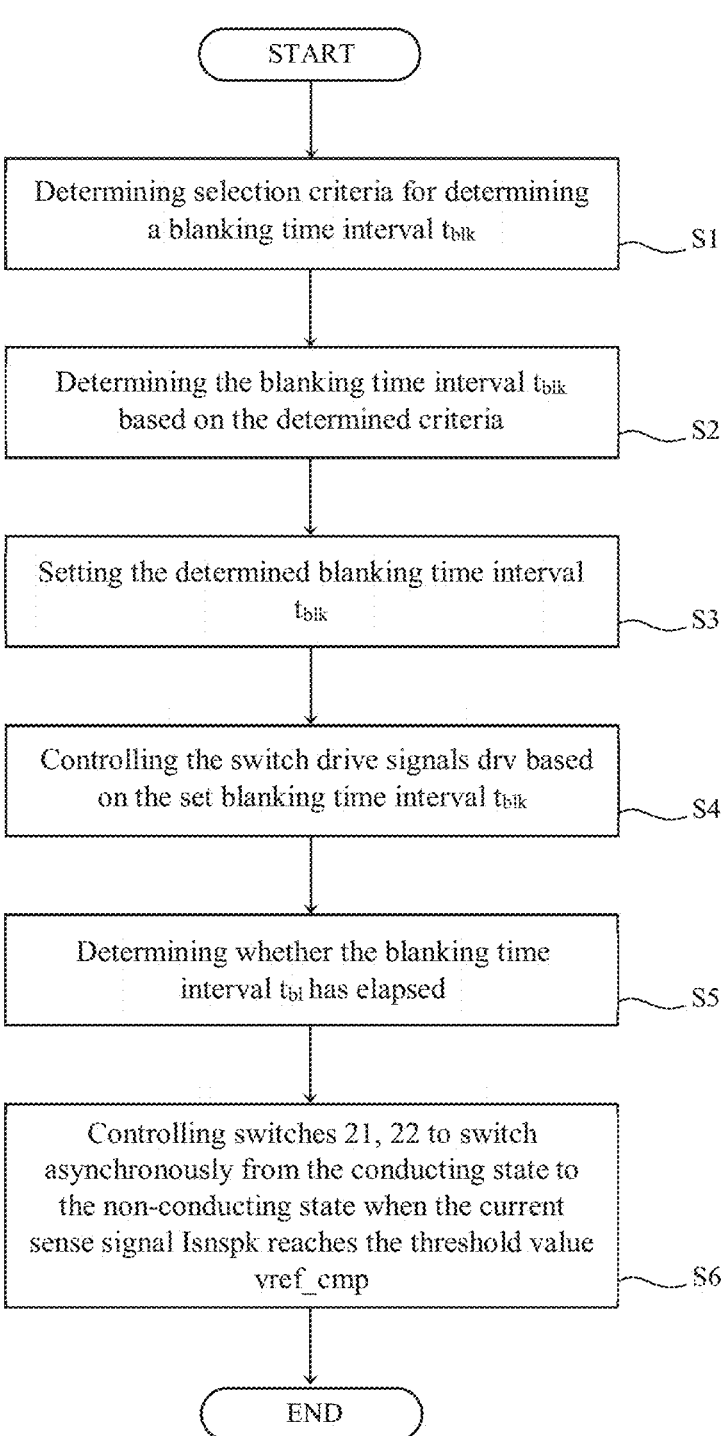
FIG. 8 is a simplified flowchart of a method for controlling the converter circuit according to an embodiment.

FIG. 8 is a simplified flowchart of a method for controlling the converter circuit 20 according to an embodiment.

The method starts with a step S1 of determining selection criteria for determining a time duration of the blanking time interval $t_{blk}$.

The method proceeds with a step S2 of determining the blanking time interval $t_{blk}$, based on the determined criteria for determining the time duration of the blanking time interval $t_{blk}$.

In step S3, the blanking time interval $t_{blk}$ is set according to the determined blanking time interval $t_{blk}$.

In step S4, the method proceeds with controlling the switch drive signals dry based on the set blanking time interval $t_{blk}$ starting at a time when the first switch 21 switches from the non-conducting state to the conducting state. During the blanking time interval $t_{blk}$, the control circuit inhibits outputting switch drive signals $\text{VGS}_{HS}$, $\text{VGS}_{LS}$ to the first switch 21 from the conducting state to the non-conducting state and the second switch 22 from the non-conducting state to the conducting state.

In step S5, the method determines whether the blanking time interval $t_{bl}$ has elapsed.

When the blanking time interval $t_{blk}$ has elapsed, the method proceeds to step S6. In step S6, the method proceeds with controlling the switches 21, 22 to switch asynchronously from the conducting state to the non-conducting state when the current sense signal Isnspk reaches the threshold value vref_cmp.

The steps S1 to S6 for controlling the switches 21, 22 of the converter circuit 20 may be implemented as software or firmware running on hardware such as a microprocessor or microcontroller.

Alternatively, the control circuit may implement the steps in the form of hardware elements, for example in an ASIC.

All steps, which are performed by the various entities described in the disclosure, as well as the functionalities described to be performed by the various entities are intended to mean that the respective entity is adapted to or configured to perform the respective steps and functionalities. In the claims as well as in the description, the word "comprising" does not exclude the presence of other structural elements or steps.

The indefinite article "a" or "an" with an element does not exclude denoting plural elements. A single element or other unit may fulfill the functions of several entities recited in the claims. A single structural element recited in a claim may correspond to several entities recited in the description or depicted in the figures. This applies, for example, to the control circuit recited in the claims, which corresponds to the ASIC 6 and the microcontroller 7 of the embodiment.

The mere fact that different dependent claims recite particular measures and features of the converter circuit does not exclude a combination of these measures and features being combined in an advantageous implementation of the converter circuit.

The invention claimed is:

1. A converter circuit for providing a load current ($I_{LOAD}$) to a lighting device (2), the converter circuit comprising:

at least one switch (21) configured to switch between a conducting state and a non-conducting state based on a switch control signal ($\text{VGS}_{HS}$);

a current sense circuit (28, 29, 30, 31) configured to generate a current sense signal (Isnspk) based on a sensed current via the switch (21);

a control circuit (6, 7) configured to generate the switch control signal ($\text{VGS}_{HS}$) based on the current sense signal (Isnspk), wherein the control circuit (6, 7) is further configured to control the switch (21) to switch asynchronously from the conducting state to the non-conducting state when the current sense signal (Isnspk) reaches a threshold value (vref_cmp);

wherein the control circuit (6, 7) is further configured to set a blanking time interval ($t_{blk}$), wherein the blanking time period ($t_{blk}$) starts at a time when the switch (21) switches from the non-conducting state to the conducting state, wherein the control circuit (6, 7) is further configured to inhibit switching the switch (21) from the conducting state to the non-conducting state during the blanking time interval ($t_{blk}$); and wherein the control circuit (6, 7) is further configured to obtain a temperature value and to set a time duration of the blanking time interval ($t_{blk}$) based on the obtained temperature value.

2. The converter circuit according to claim 1, wherein the converter circuit is a switched mode power supply in a synchronous Buck topology or a synchronous Flyback topology.

3. The converter circuit according to claim 1, wherein the control circuit (6, 7) comprises a comparator configured to compare the current sense signal (Isnspk) with the threshold value (vref_cmp).

4. The converter circuit according to claim 1, wherein the control circuit (6, 7) comprises an analogue input terminal, and the control circuit (6, 7) is configured to generate the switch control signal to control the switch to switch from the conducting state to the non-conducting state when the current sense signal received at the analogue input terminal reaches or exceeds the threshold value.

5. The converter circuit according to claim 4, wherein the control circuit (6, 7) is configured to generate the switch control signal ($VGS_{HS}$) to control the switch (21) to switch immediately from the conducting state to the non-conducting state when the current sense signal (Isnspk) received at the analogue input terminal reaches or exceeds the threshold value (vref_cmp) and the blanking time interval ($t_{blk}$) has elapsed.

6. The converter circuit according to claim 1, wherein the control circuit (6, 7) is configured to set the blanking time interval ($t_{blk}$) based on the electric load to which the load current ($I_{LOAD}$) is provided.

7. The converter circuit according to claim 1, wherein the converter circuit comprises an interface (9) for obtaining a user adjustable input signal (10), and the control circuit (6, 7) is configured to set a time duration of the blanking time interval ($t_{blk}$) based on the obtained input signal (10).

8. A luminaire comprising at least one converter circuit (20) according to claim 1, and at least one lighting module (2).

9. A method for controlling a converter circuit (1), the converter circuit (1) configured for providing a load current ($I_{LOAD}$) to a load comprising a lighting device (2), wherein the converter circuit (1) comprises:

at least one switch (21) configured to switch between a conducting state and a non-conducting state based on a switch control signal ($VGS_{HS}$), a current sense circuit (28, 29, 30, 31) configured to generate a current sense signal (Isnspk) based on a sensed current via the switch (21);

a control circuit (6, 7) configured to generate the switch control signal ($VGS_{HS}$) based on the current sense signal (Isnspk); and the method comprising the step of controlling (S6) the switch (21) to switch asynchronously from the conducting state to the non-conducting state when the current sense signal (Isnspk) reaches a threshold value (vref_cmp);

the method further comprising the step of setting (S3) a blanking time interval ($t_{blk}$), wherein the blanking time interval ($t_{blk}$) starts at a time when the switch (21) switches from the non-conducting state to the conducting state, wherein during the blanking time interval ($t_{blk}$) (S4, S5), the method inhibits switching the switch (21) from the conducting state to the non-conducting state, and wherein the control circuit (6, 7) is further configured to obtain a temperature value and to set a time duration of the blanking time interval ($t_{blk}$) based on the obtained temperature value.

10. A computer program comprising instructions, wherein when the program is executed by a computer or signal processor, the computer or signal processor carries out the method of claim 9.

* * * * *